United States Patent [19]

Yoshida

[11] Patent Number: 5,605,957
[45] Date of Patent: Feb. 25, 1997

[54] SILICONE COMPOSITION AND METHOD OF PRODUCING THE SAME

[75] Inventor: Yoshiro Yoshida, Furukawa, Japan

[73] Assignee: Alps Electric Co., Ltd., Tokyo, Japan

[21] Appl. No.: 257,986

[22] Filed: Jun. 10, 1994

[30] Foreign Application Priority Data

Jul. 1, 1993 [JP] Japan .................................. 5-189001

[51] Int. Cl.$^6$ .............................. B01J 13/00; C08L 83/04
[52] U.S. Cl. ........................ 524/731; 524/760; 524/765; 524/837; 252/315.4; 252/315.6; 508/136; 508/213
[58] Field of Search ...................... 524/837, 860, 524/765, 731; 252/315.4, 315.6, 28, 35, 41, 39

[56] References Cited

U.S. PATENT DOCUMENTS

| | | | |
|---|---|---|---|
| 4,680,331 | 7/1987 | Suzuki et al. ............................ | 524/269 |
| 4,892,907 | 1/1990 | Lampe et al. ........................... | 524/731 |
| 5,162,407 | 11/1992 | Turner .................................... | 524/108 |
| 5,207,932 | 5/1993 | Norman et al. ........................... | 252/3 |
| 5,447,982 | 9/1995 | Kamba et al. ........................... | 524/458 |

FOREIGN PATENT DOCUMENTS 60-115696  6/1985  Japan .

*Primary Examiner*—Karen A. Dean
*Attorney, Agent, or Firm*—Guy W. Shoup; Patrick T. Bever

[57] ABSTRACT

A silicone composition containing: (A) 100 parts by weight of organopolysiloxane; 0.1 to 50 parts by weight of thickening agent (C) 0.01 to 20 parts by weight of fluorine-containing surfactant; and (D) 0.1 to 20 parts by weight of volatile water-soluble solvent.

10 Claims, No Drawings

SILICONE COMPOSITION AND METHOD OF PRODUCING THE SAME

BACKGROUND OF THE INVENTION

1. Field of the Invention

The present invention relates to a silicone composition containing liquid organopolysiloxane as main component and made into semi-solidified form by a thickening agent.

2. Description of the Related Art

Hitherto, the lubricants used for the light weight sliding section upon which is exerted a light load in electronic equipment and the like have incorporated silicone, mineral oil, and synthetic oil. Among them, the silicone-containing lubricants which do not deteriorate by oxidation over a long period of time have come to occupy a very important place, in recent years, because they are reliable over an extented period of time. In addition, since they have excellent characteristics in the low-temperature region, they are widely used. In contrast, compared to lubricants containing silicone, lubricants containing mineral oil and lubricants containing synthetic tend to deteriorate, and the oil viscosity generally increases drastically in the low temperature region, thereby making it difficult to guarantee stable mechanical operation. In such a way, the silicone-containing lubricants provide good performance for use in the relatively light weight sliding section upon which is exerted a relatively light load. Such lubricants, however, tend to spread considerably on the coated surface as a result of the properties that it has on the surface. Accordingly, the lubricant composition spreads and adheres onto portions where it should not in the first place, thus giving rise to a very inconvenient problem.

There are silicone-containing compositions, compounds, and adhesives used for improving heat radiation and the like. In the same way, however, these spread to unnecessary portions on the surface and ooze out, making it very inconvenient to work with and to utilize the finished products containing thereof.

On the other hand, up to the present time, various attempts have been made to minimize the oozing of the compositions containing such liquid component as the primary component. This may be accomplished for some such compositions by conventional techniques. These techniques, however, include the step of adding fluorine-containing surfactants to the compositions, which means they may be expected to be effective for compositions containing as primary component liquid components other than those in silicone-containing compositions, but not for those in silicone-containing compositions. This is because the fluorine-containing surfactants in the silicone-containing compositions are not effectively dispersed nor effectively arranged at the interface in the gas, liquid, and solid phases, so that it is impossible to expect the method to be effective in eliminating oozing of the compositions to about the same extent.

SUMMARY OF THE INVENTION

To these ends, the present invention provides a silicone composition used in a semi-solidified form so that it does not diffuse on the surface.

DESCRIPTION OF THE PREFERRED EMBODIMENT

A silicone composition of the present invention composed of (A) 100 parts by weight of organopolysiloxane, (B) 0.1 to 50 parts by weight of thickening agent, (C) 0.01 to 20 parts by weight of fluorine-containing surfactant, and (D) 0.1 to 20 parts by weight of volatile water-soluble solvent wherein the composition is produced by a process including the steps of (a) mixing 100 parts by weight of organopolysiloxane and 0.1 to 50 parts by weight of thickening agent, (b) dissolving 0.01 to 20 parts weight of fluorine-containing surfactant in 0.1 to 20 parts by weight of volatile water-soluble solvent, (c) adding the mixture produced in step (b) to the mixture produced in step (a), and (d) uniformly dispersing and kneading the mixture formed in step (c).

In the present invention, there is represented in the following Formula 3, the average structural formula of the polyorganosiloxane (component A), which is the main component of the silicone composition.

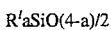

$R^1{}_a SiO_{(4-a)/2}$

In the Formula, the organic group $R^1$ bonded with a silicon atom may represent an alkyl group having 1 to 30 carbon atoms such as a methyl group, an ethyl group, a propyl group, a butyl group, an amyl group, a hexyl group, an octyl group, a dodecyl group, a hexadecyl group, an octadecyl group, and an eicosyl group, an aryl group such as a phenyl group, an aralkyl group such as a β-phenylethyl group, a β-phenylpropyl group, and a univalent substituted hydrocarbon group such as a chloromethyl group, a 3, 3, 3-trifluoropropyl group, and a chlorinated phenyl group and the like. $R^1$ may represent the same or two or more dissimilar groups mentioned above. It is not desirable that the alkyl group contains more than 30 atoms because it becomes difficult to work with and its thermal stability is also reduced. It is preferable that the methyl group accounts for at least 50% of the organic groups because it is easy to synthesize and has good thermal resistance.

In addition, a represents numbers 1.9 to 2.7 and indicates the average value per silicon atom in the polymer molecule. A value less than 1.9 results in a hard composition so that the effect of the invention is drastically reduced. A value greater than 2.7 results in an unsuitable viscosity range. In other words, it is desirable that the organopolysiloxanes have a viscosity range of from 10 to 100,000 cSt at a temperature of 25° C. A viscosity less than 10 cSt increases the volatility of the organopolysiloxanes, making it difficult to maintain the basic form of the composition. A viscosity greater than 100,000 c/st, on the other hand, results in a hard composition, so that the effect of the invention is greatly reduced. Such organopolysiloxanes may be mixtures having different viscosities, have straight-chained or branched molecules, or a combination of these.

In the present invention, the thickening agent of (B) makes the organopolysiloxanes of (A) viscous, which is effective in stabilizing the gel formed to limit fluidity. Examples thereof include silica powder, metallic soap, carbon, graphite, talc, organic transformed bentonite, urea resin, molybdenum disulfide, and Teflon. It is necessary that the thickening agent is contained in an amount of from 0.1 to 50 parts by weight with respect to 100 parts by weight of component (A). When the amount is less than 0.1 parts by weight, a suitable semi-solidified condition cannot be obtained, and therefore the composition cannot prevent itself from being diffused. An amount in excess of 50 parts by weight is not desirable because the composition is hardened to such an extent as to make it difficult to use. Among the thickening agents, silica powder and metallic soap are excellent for gel formation, and are particularly effective in producing a semi-solidified composition.

Examples of silica powder include aerosol silica, precipitate silica, and silica aerogel. They can be of any particle diameter and surface area. These types of silica powder may have their surfaces treated with organosilane, polyorganosilane, organosilazane, and the like, for use.

Usable metallic soaps include lithium stearate, aluminum stearate, lithium oreate, aluminum oreate, sodium oreate, and calcium stearate. In mixing with liquid organopolysiloxane, they may be used singly or in combination of two or more types. The silica powder and the metallic soap may respectively be used singly, or in combination thereof.

In the present invention, the fluorine-containing surfactant (component (C)) is directly effective in restricting the diffusion of the liquid organopolysiloxane. Examples thereof include anionic, cationic, amphoteric, and non-ionic activators. Useful anionic fluorine-containing surfactants include perfluoroalkyl carboxylate, and perfluoroalkyl phosphate; and usable cationic fluorine-containing surfactants include perfluoroalkyltrimethyl ammonium salt. Examples of amphoteric fluorine-containing surfactants include perfluoroalkylamineoxide and perfluoroalkylethyleneoxide adducts. It is necessary that these fluorine-containing surfactants are contained in an amount of from 0.01 to 20 parts by weight with respect to 100 parts by weight of the component (A). An amount less than 0.01 parts by weight thereof is not enough to cover the surface of the liquid organopolysiloxane, so that it is not sufficiently effective in preventing diffusion. An amount in excess of 20 parts by weight destroys the essential characteristics of the silicone composition.

Particularly preferable examples of the fluorine-containing surfactants (Component C) include, when alkyl alcohol is used, anionic surfactants because of their mutual solubility and their arrangement when they are dissolved. Useful anionic fluorine-containing surfactants include carboxylates and phosphates, of which among the carboxylates preferable is perfluoroalkylcarboxylate, whose general structural formula is represented in the following Formula 4:

$$RfCO_2^+<B>^-$$

[where, $Rf=C_n F_{2n+1}$ (and n=4 through 14)]

[<B> is a basic atom or a functional group]

And a preferable perfluoroalkylcarboxylate is ammonium salt, whose general structural formula, is represented in the following Formula 5 because of the homogeneous dispersion in organopolysiloxane:

$$RfCO_2^+NH_4^-$$

[where, $Rf=C_n F_{2n+1}$ (and n=4 through 14)]

A typical example of such surfactants includes a solid component of Surflon S-111 manufactured by Seimichemical.

The volatile water-soluble solvent. (component D) used in the present invention is indispensable for properly and uniformly dispersing the fluorine-containing surfactant in the organopolysiloxane. The volatile solvent must be able to dissolve the component (C). In addition, the solution, formed by the fluorine-containing surfactant and the volatile solvent, disperses (i.e., does not dissolve) in the organopolysiloxano. Therefore, this volatile water-soluble solvent must have good volatility, which is not mutually soluble with organopolysiloxane. The use of fine volatile water-soluble solvent (component D) which is not mutually soluble with silicone oil is very effective in allowing the fluorine-containing surfactant, which is dissolved therein, to exist uniformly in the composition. Examples thereof include alcohols such as methyl alcohol, ethyl alcohol, propyl alcohol, isopropyl alcohol, and butyl alcohol, and ethers such as dimethyl ether, diethyl ether, and methylethyl ether. These volatile water-soluble solvents must be used in an amount of from 0.1 to 20 parts by weight with respect to 100 parts by weight of the component (A). When the amount is less than 0.1 parts by weight, sufficient dispersion of the fluorine-containing surfactants cannot be expected, and when the amount exceeds 20 parts by weight, the solvent causes the surfactant to be dispersed on the surface, so that its primary effects are not realized.

The silicone composition of the present invention is not only effective as a lubricant, but also as a composition for overcoming similar problems arising from the use of silicone-containing adhesives and silicone-containing coatings by adding to a composition which contains the composition of the present invention as base material a component which hardens it.

The silicone composition of the present invention is produced by a process containing the series of steps, which are strictly to be carried out in the following order, of mixing the foregoing components (A) and (B); adding and sufficiently dissolving the component (C) in the component (D); adding the mixture containing component (C) dissolved in the component (D) to a mixture of the component (A) and the component (B), afterwhich the resulting mixture is uniformly dispersed and kneaded at room temperature of preferably 30° C. or less.

The silicone composition of the present invention was tested and verified as to whether the extent to which it oozes out was effectively reduced. The results are shown by comparing the examples, comparative examples, and conventional examples.

The test sample was prepared by coating each of the compositions to a thickness of 1 mm and having a circular area of 1 cm in diameter onto a sufficiently washed ground glass.

In the test, the foregoing test sample was heated and allowed to stand in a constant temperature vessel for a certain period of time, afterwhich the diffusion area of the coated surface was measured. The test was allowed to stand at a temperature of 60° C., 85° C., and 100° C. in the constant temperature vessel for 25, 50, and 100 hours, respectively.

The test results were evaluated based on the ratio of the area of diffusion after the period of time the test material was left standing with respect to the original area.

The component of each of the test samples and their compositions are shown in Table 1 below.

TABLE 1

| COMPOSITION | CONVENTIONAL EXAMPLES | | EXAMPLES | | | | | | COMPARATIVE EXAMPLES | | | |
|---|---|---|---|---|---|---|---|---|---|---|---|---|
| | ① | ② | ① | ② | ③ | ④ | ⑤ | ⑥ | ① | ② | ③ | ④ |
| a | 100 | | 100 | 100 | 100 | 100 | 100 | 100 | 100 | 100 | 100 | 100 |
| b | | 100 | | | | | | | | | | |
| c | 5.0 | 5.0 | 5.0 | 5.0 | 5.0 | 5.0 | 5.0 | 5.0 | 5.0 | 5.0 | 5.0 | 5.0 |
| d | | | 0.2 | 0.01 | 0.2 | 0.2 | | | 0.2 | | .005 | |

TABLE 1-continued

| COMPOSITION | CONVENTIONAL EXAMPLES ① | CONVENTIONAL EXAMPLES ② | EXAMPLES ① | EXAMPLES ② | EXAMPLES ③ | EXAMPLES ④ | EXAMPLES ⑤ | EXAMPLES ⑥ | COMPARATIVE EXAMPLES ① | COMPARATIVE EXAMPLES ② | COMPARATIVE EXAMPLES ③ | COMPARATIVE EXAMPLES ④ |
|---|---|---|---|---|---|---|---|---|---|---|---|---|
| e |  |  |  |  |  |  | 0.2 |  |  |  |  |  |
| f |  |  |  |  |  |  |  | 0.2 |  |  |  |  |
| g |  |  |  |  |  |  |  |  |  | 0.2 |  |  |
| h |  |  | 2 | 2 |  |  | 5 | 2 | 2 |  | 2 | 30 |
| i |  |  |  |  | 2 |  |  |  |  |  |  |  |

In Table 1, component a of the composition is polydimethylsiloxane having an average viscosity of 1,000 cSt, and component b is polydimethylsiloxane having an average viscosity of 10,000 cSt. Component c is silica aerogel represents an example of an anionic fluorine-containing surfactant, that is ammonium salt of perfluoroalkylcarboxylic acid; e represents an example of an anionic fluorine-containing surfactant, that is perfluoroalkylphosphate; and f represents an example of a cationic fluorine-containing surfactant, that is perfluoroalkyltrimethylammonium salt. g represents a fluorine-containing surfactant having a perfluoroalkylethyleneoxide chain. Further, h represents ethyl alcohol, and i represents methyl alcohol.

Conventional example 1 is a standard silicone composition, which needs to be improved to prevent it from diffusing on the surface, while it retains its fluidity and other properties. Conventional example 2 is one in which the viscosity of the liquid component which serves as a base is increased carried out as a general method for limiting diffusion. However, this method considerably changes its essential properties such as fluidity (in correspondence with conventional example 1), which results in the production of a composition having different properties. Comparative example 1 is one not containing the component (D), namely the volatile solvent, among the components of the present invention, and retains the properties of the conventional example 1. The conventional example 2 is one containing the component (C), or the fluorine-containing surfactant, which is said to be effective in preventing diffusion of compositions on the surface other than those containing silicone. This composition also retains the properties of the conventional example 1. Comparative example 3 is an example of one which contains the component (C), or fluorine-containing solvents, among the components of the present invention in an amount outside the range of the claims. Comparative example 4 is an example of one which contains the component (D) of the present invention in an amount outside the range of the claims. This causes significant changes in the fluidity in the coated state, but after the volatile solvent has vaporized, it retains the properties of the conventional example 1.

After sufficient diffusion of the volatile solvent, each of the compositions of the examples exhibit the exact same lubricating performance as the conventional example 1.

The evaluation of the test results of surface diffusion is shown in Table 2 below.

TABLE 2

|  | Initially | 60° C. 25 | 60° C. 50 | 60° C. 100H | 85° C. 25 | 85° C. 50 | 85° C. 100H | 100° C. 25 | 100° C. 50 | 100° C. 100H |
|---|---|---|---|---|---|---|---|---|---|---|
| Conventional Ex. 1 | O | X | X | X | X | X | X | X | X | X |
| Conventional Ex. 2 | O | Δ | X | X | X | X | X | X | X | X |
| Comparative Ex. 1 | O | X | X | X | X | X | X | X | X | X |
| Comparative Ex. 2 | O | X | X | X | X | X | X | X | X | X |
| Comparative Ex. 3 | O | O | O | Δ | O | Δ | X | X | X | X |
| Comparative Ex. 4 | X | X | X | X | X | X | X | X | X | X |
| Example 1 | O | O | O | O | O | O | O | O | O | Δ |
| Example 2 | O | O | O | O | O | O | O | O | O | Δ |
| Example 3 | O | O | O | O | O | Δ | Δ | O | Δ | Δ |
| Example 4 | O | O | O | Δ | O | Δ | Δ | O | Δ | X |
| Example 5 | O | O | O | Δ | O | Δ | Δ | O | Δ | Δ |
| Example 6 | O | O | O | Δ | O | Δ | Δ | O | Δ | Δ |

Standard of Evaluation
O: < × 1.5
Δ: × 1.6 to × 10
X: > × 10

As is apparent from Table 2, in the comparative examples 1 and 2, merely adding the component (C), namely the fluorine-containing surfactant does not allow it to effectively prevent oozing of the composition. On the other hand, the examples of the present invention exhibited strikingly positive effects, which are not observed in the conventional examples, over a wide temperature range and in elevated temperature regions.

This is because the fluorine-containing solvent is allowed to exist uniformly in the silicone-containing composition by the method of producing a silicone composition of the present invention comprising the steps of dissolving the aforementioned component (C) in the fine volatile water-soluble solvent; and uniformly dispersing and kneading the resulting solution in the silicone-containing composition.

As is apparent from the above-described results, the diffusion on the surface from the coated portion can be eliminated over a wide temperature range. This is made possible by a silicone composition of the present invention containing with respect to 100 parts by weight of component A, or organopolysiloxane, 0.1 to 50 parts by weight of component B, or thickening agent, 0.01 to 20 parts by weight of component C or fluorine-containing surfactant, and 0.1 to 20 parts by weight of component D or volatile water-soluble solvent. This composition is obtained by uniformly kneading a mixture of the component (C) dissolved in the component (D), the component (C) being effective in preventing surface diffusion, in a mixture of the component (A) and component (B).

What is claimed is:

1. A silicone composition comprising: (A) 100 parts by weight of liquid organopolysiloxane; (B) 0.1 to 50 parts by weight of thickening agent; (C) 0.01 to 20 parts by weight of fluorine-containing surfactant; and (D) 0.1 to 20 parts by weight of volatile water-soluble solvent.

2. A silicone composition according to claim 1, wherein the thickening agent is metallic soap.

3. A silicone composition according to claim 1, wherein the thickening agent is silica powder.

4. A silicone composition according to claim 3, wherein the silica powder is aerosol silica.

5. A silicone composition according to claim 1, wherein the fluorine-containing surfactant is an anionic fluorine-containing surfactant.

6. A silicone composition according to claim 5, wherein the anionic fluorine-containing surfactant is perfluoroalkylcarboxylate represented by the following general structural formula 1.

$$RfCO_2^+<B>^-$$

[where, $Rf=C_nF_{2n+1}$ (and n=4 to 14)]

[<B> is a basic atom or functional group]

7. A silicone composition according to claim 6, wherein the perfluoroalkylcarboxylate is an ammonium salt represented by the following general structural formula 2.

$$RfCO_2^+NH_4^-$$

[where, $Rf=C_nF_{2n+1}$ (and n=4 to 14)]

8. A silicone composition according to claim 1, wherein the volatile water-soluble solvent is alkyl alcohol.

9. A silicone composition according to claim 8, wherein the volatile water-soluble solvent is ethyl alcohol.

10. A method of producing a silicone composition comprising the steps of:

(a) mixing 100 parts by weight of organopolysiloxane and 0.1 to 50 parts by weight of thickening agent;

(b) dissolving 0.01 to 20 parts by weight of fluorine-containing surfactant in 0.1 to 20 parts by weight of volatile water-soluble solvent;

(c) adding the mixture produced in step (b) to the mixture produced in step (a); and (d) uniformly dispersing and kneading the mixture formed in step (c).

* * * * *